(12) United States Patent
Thirupathi et al.

(10) Patent No.: US 9,145,164 B2
(45) Date of Patent: Sep. 29, 2015

(54) INTEGRAL HYDRAULIC POWER STEERING GEAR

(71) Applicant: Rane TRW Steering Systems Limited, Viralimalai (IN)

(72) Inventors: Ramanathan Thirupathi, Viralimalai (IN); Velayuthapandian Suresh Kantha Kumar, Viralimalai (IN); Sivaperumal Prakasam, Viralimalai (IN)

( * ) Notice: Subject to any disclaimer, the term of this patent is extended or adjusted under 35 U.S.C. 154(b) by 0 days.

(21) Appl. No.: 14/250,511

(22) Filed: Apr. 11, 2014

(65) Prior Publication Data

US 2014/0305730 A1  Oct. 16, 2014

(30) Foreign Application Priority Data

Apr. 12, 2013  (IN) ............................ 1660/CHE/2013

(51) Int. Cl.
*B62D 5/12* (2006.01)
*B62D 5/22* (2006.01)

(52) U.S. Cl.
CPC ... *B62D 5/12* (2013.01); *B62D 5/22* (2013.01)

(58) Field of Classification Search
CPC .......... B62D 5/06; B62D 5/062; B62D 5/065; B62D 5/12; B62D 5/22
USPC ........................................ 180/427, 417, 426
See application file for complete search history.

(56) References Cited

U.S. PATENT DOCUMENTS

| | | | |
|---|---|---|---|
| 2,030,902 A | | 2/1936 | Vickers |
| 3,602,101 A | * | 8/1971 | Jablonsky et al. .............. 91/422 |
| 3,733,967 A | * | 5/1973 | Duffy .......................... 91/375 A |
| 3,756,340 A | * | 9/1973 | Millard ......................... 180/427 |
| 3,757,602 A | * | 9/1973 | Forster et al. ................... 74/499 |
| 3,773,081 A | | 11/1973 | Venable et al. |
| 3,872,774 A | * | 3/1975 | Forster et al. ................... 91/400 |
| 3,896,702 A | | 7/1975 | Shah et al. |
| 4,009,641 A | | 3/1977 | Rohde et al. |
| 4,010,815 A | * | 3/1977 | Strauff ......................... 180/442 |
| 4,028,998 A | * | 6/1977 | Jablonsky ...................... 92/107 |
| 4,036,110 A | | 7/1977 | Galonska et al. |
| 4,198,898 A | | 4/1980 | Elser |
| 4,200,030 A | * | 4/1980 | Elser ........................... 91/375 A |
| 4,202,249 A | * | 5/1980 | Jablonsky et al. .............. 91/422 |

(Continued)

FOREIGN PATENT DOCUMENTS

EP  1452419 A1  9/2004
GB  907081 A  10/1962

*Primary Examiner* — Tony Wiinner
*Assistant Examiner* — Michael Stabley
(74) *Attorney, Agent, or Firm* — Vic Lin; Innovation Capital Law Group, LLP

(57) ABSTRACT

The present invention relates to a compact and light weight integral hydraulic power assisted steering gear arrangement comprising housing; a cylinder in the housing having pressure chambers; an axially bored rack piston slidably carried in the cylinder; an output shaft journaled on the housing for rotating about an axis with a sector gear; a worm extending in axial alignment into the bore of rack piston; an operating steering shaft journaled for rotation on the housing; a control valve positioned in valve chamber of the housing; and one or more covers fixed on to the housing through one or more locker wires for sealing the hydraulic fluid, supporting worm and output shaft. The rack piston is two separate components. The rack with axially bored helical grooves and a series of rack teeth is supported by rack supporter assembly on one side and by the piston on the other end.

9 Claims, 5 Drawing Sheets

(56) References Cited

U.S. PATENT DOCUMENTS

Figure 1:
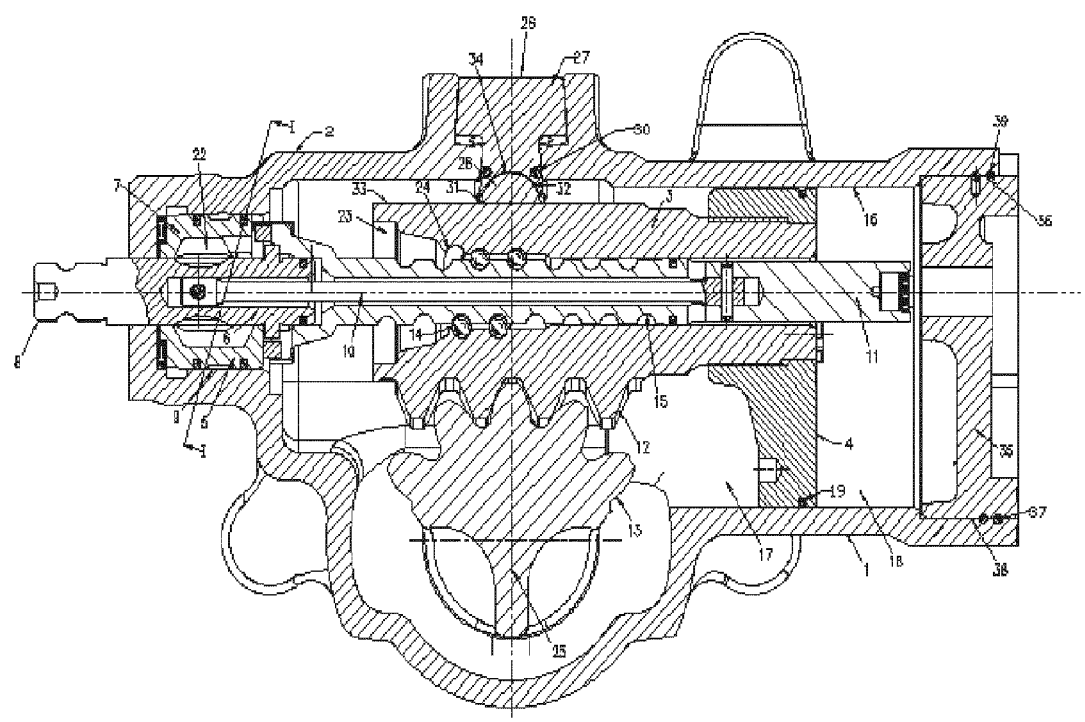

| | | | | |
|---|---|---|---|---|
| 4,232,586 A | * | 11/1980 | Elser | 91/467 |
| 4,290,344 A | | 9/1981 | Adams | |
| 4,895,037 A | * | 1/1990 | Komatsu | 74/422 |
| 4,942,803 A | * | 7/1990 | Rabe et al. | 91/370 |
| 5,303,793 A | * | 4/1994 | Kato et al. | 180/417 |
| 7,484,588 B2 | | 2/2009 | Szabela et al. | |
| 2012/0305328 A1 | | 12/2012 | Rombold | |

* cited by examiner

INTEGRAL HYDRAULIC POWER STEERING GEAR

FIELD OF INVENTION

The present invention relates to integral hydraulic power assisted steering gears. More particularly, the present invention relates to a new and improved integral hydraulic power assisted steering gear arrangement for vehicles, which is compact, lightweight, without compensating in efficiency and can be constructed and assembled economically. Compactness and weight are important considerations in the application and utilization of hydraulic power steering gear in vehicular steering.

DESCRIPTION OF PRIOR ART

Basically an integral hydraulic power assisted steering gear comprises a housing including a cylinder, a piston in the cylinder, an output shaft which is connected to the pitman arm by nut or bolt outside the housing for connection to the mechanical steering linkage of the vehicle. The piston which divides the cylinder into top and bottom chambers, generally has a gear rack formed thereon having teeth which mesh with the teeth of the sector gear carried on or formed on the output shaft which intern is supported with a cover mounted in housing. As the piston is moved axially in the cylinder it provides a corresponding rotational movement to the output shaft through the rack gear and sector gear to intern manipulate the steered wheels of the vehicle. The output shaft is journaled for rotation within a cover which is mounted on to the housing through fixing means. A control valve includes a follow up arrangement for controlling the flow of fluid to and from the cylinder, to control the operation of the piston and the output shaft in response to receipt of a turning signal from steering wheel.

The steering wheel is connected to the steering shaft which is journaled for rotation on the housing of steering gear and which is connected to the control valve for controlling the flow of fluid to and from the hydraulic cylinder. The control valve comprises of inner and outer valve members, where the inner valve member extends out from valve housing as steering shaft and is connected to the steering wheel and the outer valve member is connected with the follow up member such as ball screw drive which is extending into a bore formed in the piston and mechanically connected thereto in a manner to cause the rotation of the follow up member or worm in response to the movement of the piston and to provide manual steering of the vehicle in the event of hydraulic power assistance loss. A valve centering device comprises a torsion rod which may be directly connecting the inner valve member and the follow-up member. Valve housing having pressure and return ports to connect the oil flow in and out and a valve bore in which the outer valve member is rotatably supported. Valve housing and covers are mounted on the housing with threaded holes by screws or bolts.

British patent specification number 907081 titled "STEERING GEAR" relates to a steering assembly in which an input shaft drives a longitudinally displaceable nut by rotational movement of input shaft. The nut in turn drives an output shaft which lies substantially along the same axis as of the input shaft. The rotary motion is imparted to nut by means of a track of symmetrical helix and a track follower.

U.S. Pat. No. 4,290,344 titled "GEAR ASSEMBLY" relates to a steering gear assembly, preferably for use in variable ratio power assisted steering assemblies.

U.S. Pat. No. 3,773,081 titled "POWER STEERING GEAR ASSEMBLY" describes a power steering assembly including a centrally bored rack toothed piston dividing a power cylinder in a pair of fluid pressurized chamber.

U.S. Pat. No. 4,036,110 titled "POWER STEERING GEAR WITH PISTON NUT AND SCREW OPERATIVELY CONNECTED BY CENTRALIZING ROOT DIAMETER THREAD" teaches about a power steering gear and more particularly to a new and improved piston nut and screw assembly in a power steering gear having meshing acme threads modified to improve sealing between a pair of expandable and contractible hydraulic fluid chambers. The housing is closed by an adjuster plug, threaded into one end thereof.

U.S. Pat. No. 4,009,641 titled "COMPACT POWER STEERING GEAR" relates to a power steering gear more particularly to a new and improved compact and light weight power steering gears for vehicles. The piston nut of the compact steering gear telescopes over the valve assembly and into an adjuster plug at opposite ends of its stroke to provide foreshortened gear housing.

U.S. Pat. No. 4,198,898 titled "SERVO STEERING GEAR" relates to a compact construction of steering gear, which is accomplished by hydraulic circuitry which inputs high inlet pressure to the valve housing directly to the valve groove instead of to an end of the valve body where it would exert an axial force on the torque rod.

U.S. Pat. No. 3,896,702 titled "POWER STEERING GEAR WITH RELIEF VALVE ON POWER PISTON" teaches about the vehicular power steering system with fluid pressure relief valve available in the power piston so as to reduce the damaging effect of the road shock to the tooth of rack and sector by shortening the relief valve response time.

U.S. Pat. No. 7,484,588 titled "CLOSED CENTER STEERING SYSTEM" teaches about the steering system in which an electric motor is operatively connected with the steering wheel, which when activated resist the rotation of steering wheel to provide steering feel to the vehicle driver and to modulate force applied to the steering wheel upon initial opening of the closed center valve.

US 2012/0305328 titled "STEERING SYSTEM HAVING A HYDRAULIC STEERING COLUMN" teaches about a steering system for motor vehicle, in which the steering gear shaft being in mechanical active connection with the master unit via a toothing, and also comprising hydraulic lines and a hydraulic slave unit, for swiveling steerable wheels is mechanically coupled therewith, an electronic control for controlling an electric servomotor being provided which is actively connected to the steering gear, the active connection between the steering shaft and the hydraulic master unit being a toothing with a variable transmission.

EP 1,452,419 titled "ELECTRIC POWER STEERING DEVICE" teaches about a simply constructed electric power steering apparatus capable of eliminating an existence of a backlash and reducing tooth-butting noise without any decline of a power transition performance.

U.S. Pat. No. 2,030,092 titled "HYDRAULIC STEERING GEAR", teaches about novel embodiment of hydraulic steering control with standard manually operated steering gear.

The following are the deficiencies in the existing prior art:
a. Increase in material cost due to more weight of raw material for an integral hydraulic power steering gear parts.
b. Unit output torque per weight of steering gear is low due to more weight of integral hydraulic power steering gear.
c. Decrease in fuel efficiency due to more weight of integral hydraulic power steering gear.
d. Increased number of parts.

Consequently, there exists a need for cost effective and reliable products, which would overcome all the problems stated above. The present invention aims to provide for such a product having a greatly simplified construction and exhibiting new and improved light weight parts for an integral hydraulic power assisted steering gear with one or more advantages such as simple construction, less number of parts, less manufacturing cost, etc.

OBJECTS OF INVENTION

One or more of the problems of the conventional prior art may be overcome by various embodiments of the system and method of the present invention.

Accordingly it is the basic object of the present invention to provide a compact and light weight integral hydraulic power assisted steering gear arrangement having less number of parts with improved output torque to weight ratio and increased fuel efficiency compared to the conventional integral hydraulic power assisted steering gear.

SUMMARY OF INVENTION

Thus according to the basic aspect of the present invention there is provided an integral hydraulic power assisted steering gear arrangement comprising:
Housing;
A cylinder in the housing having pressure chambers;
An axially bored rack piston slidably carried in the cylinder;
An output shaft journaled on the housing for rotating about an axis with a sector gear;
A worm extending in axial alignment into the bore of rack piston;
An operating steering shaft journaled for rotation on the housing;
A control valve positioned in valve chamber of the housing;
An inlet and outlet port integrated with the housing; and
One or more covers fixed on to the housing through one or more locker wires for sealing the hydraulic fluid, supporting worm and output shaft,
wherein the rack piston are two separate components as rack and piston,
wherein the rack with axially bored helical grooves and a series of rack teeth formed thereon is supported by rack supporter assembly on one end and by the piston on other end,
wherein axis of the valve chamber and that of the cylinder are positioned eccentrically, and
wherein the control valve is connected to the steering shaft and is movable in response to relative rotation of the steering shaft and the output shaft.

It is another aspect of present invention, wherein the rack and piston are connected together eccentrically such that axial displacement of the rack and piston is actuated eccentrically with respect to the pressure chambers through the worm.

It is another aspect of present invention, wherein the rack and the piston are relatively rotatable with respect to each other.

It is another aspect of present invention, wherein the rack supporter assembly comprises of a rack pad, rack pad adjuster, with or without spring and a sealing member.

It is another aspect of the present invention, wherein the rack pad comprises a hemispherical surface and the rack pad adjuster comprises a hemispherical bore to accommodate tilt of the rack piston when it meshes with tapered teeth of the sector gear.

It is another aspect of the present invention, wherein the worm is connected to the rack piston for rotating the worm in response to axial movement of the rack piston.

It is another aspect of the present invention, wherein the worm is interconnected to the steering shaft for rotating the worm in response to the rotation of the steering shaft.

It is another aspect of present invention, wherein the worm comprises of helical grooves formed thereon to receive a plurality of balls and is disposed in the axial bore formed in the rack.

It is another aspect of present invention, wherein the covers and the housing are fixed by the locker wires, which takes position between the helical grooves, formed on the covers and the housing respectively.

It is another aspect of the present invention, wherein the covers and housing are formed with one or more revolutions of helical groove.

It is another aspect of the present invention, wherein the locker wire used for fixing the covers and the housing can be of any geometrical shapes that include round, oval, squared, rectangle or side flattened.

The details for the invention, its aspect and advantages are explained hereunder in greater details in relation to non-limiting exemplary illustration as per the accompanying figures as detailed hereunder.

BRIEF DESCRIPTION OF THE ACCOMPANYING DRAWINGS

FIG. 1: illustrates the longitudinal sectional view of the integral hydraulic power steering gear with light weight parts according to the present invention.

Figure 2:
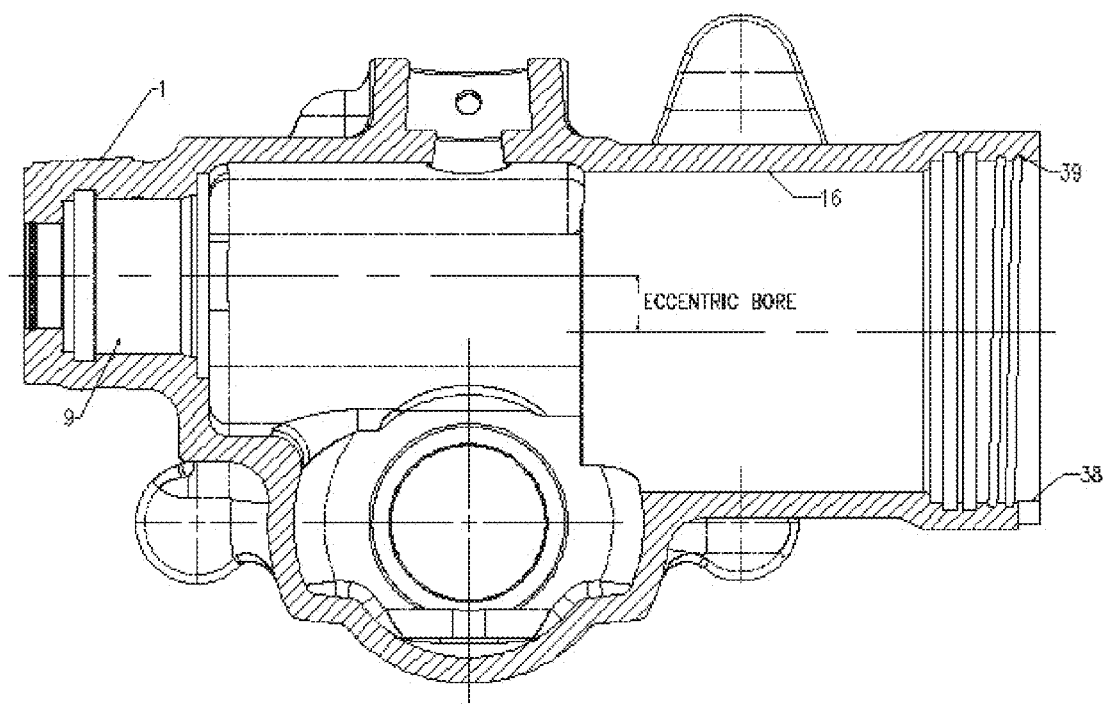

FIG. 2: illustrates the longitudinal sectional view of the housing showing the eccentric bore according to the present invention.

Figure 3:
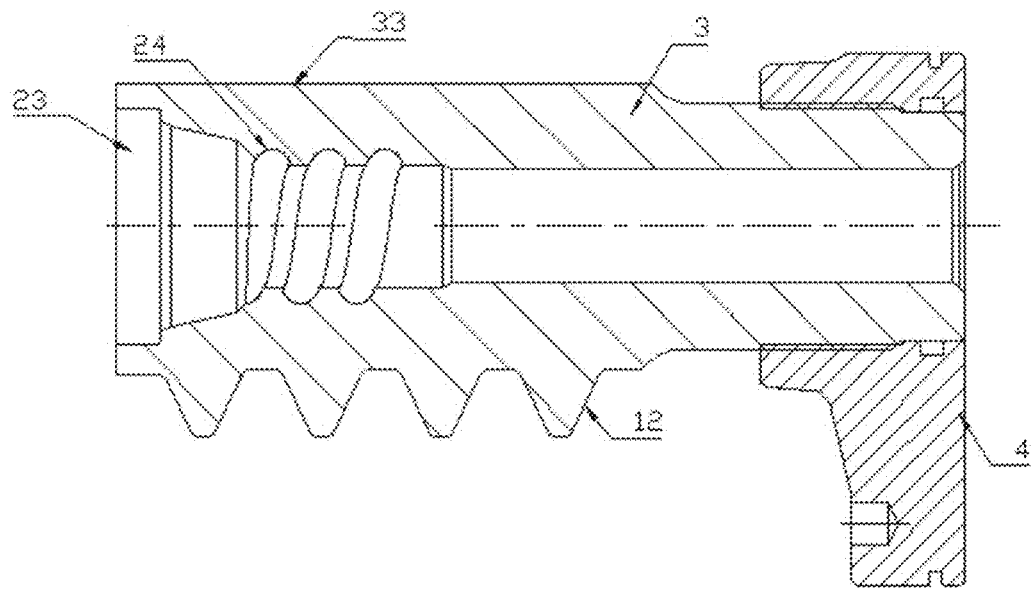

FIG. 3: illustrates the longitudinal sectional view of the rack and the piston according to the present invention.

Figure 4:
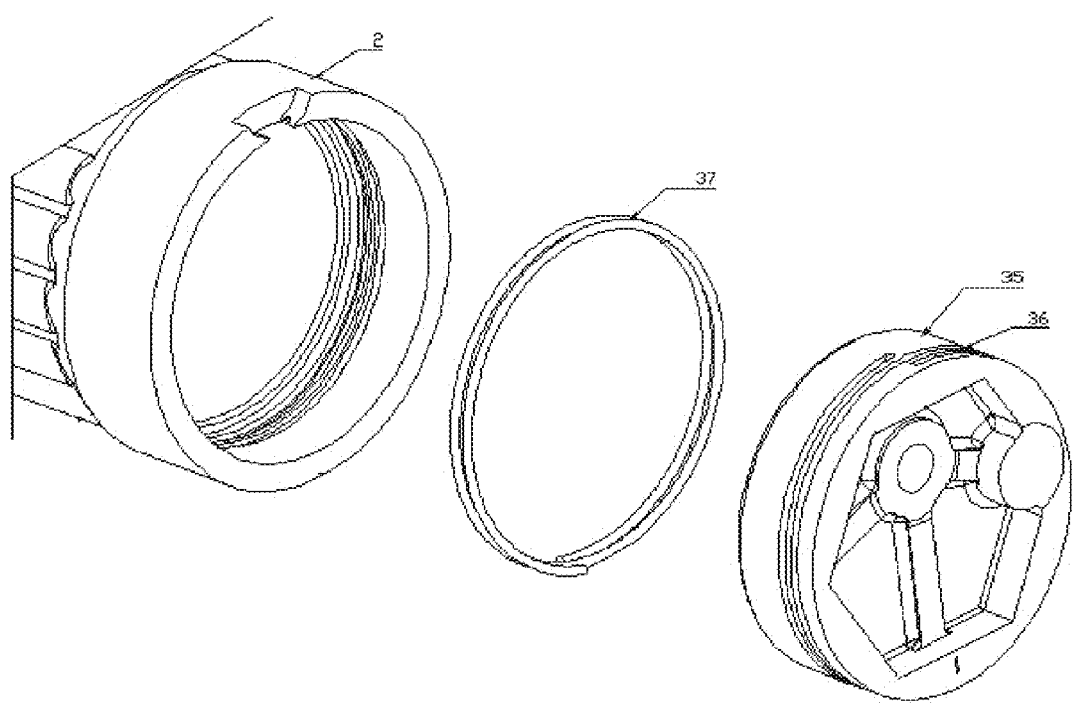

FIG. 4: illustrates the exploded view showing locker wire and helical grooves.

Figure 5:
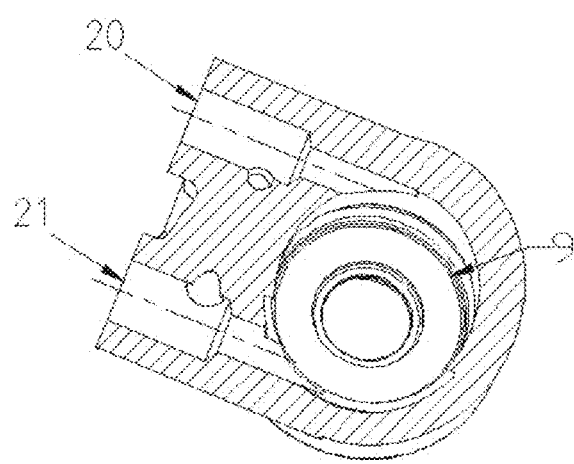

FIG. 5: illustrates the cross view of inlet and outlet ports in the housing along section I-I in FIG. 1

Figure 6:
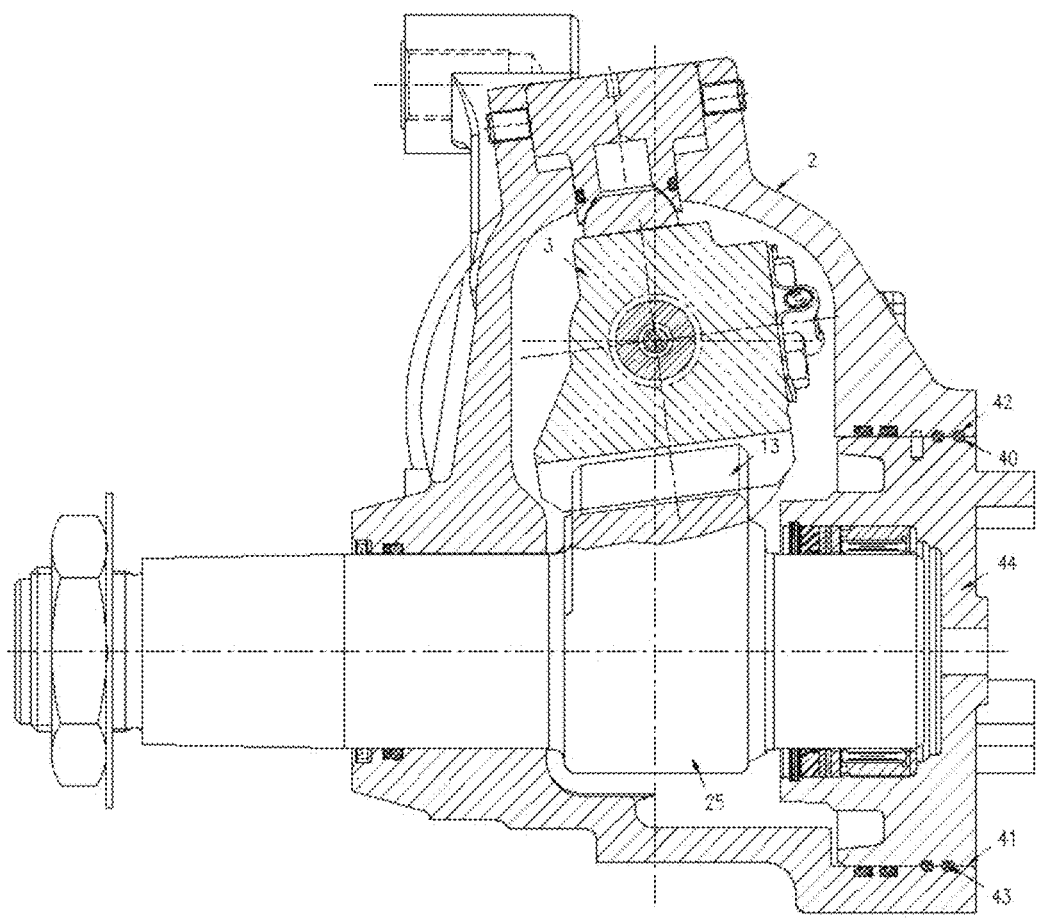

FIG. 6: illustrates the transverse section view of integral hydraulic power steering gear with light weight parts according to the present invention.

DETAILED DESCRIPTION OF THE INVENTION WITH REFERENCE TO THE ACCOMPANYING DRAWINGS

The present invention as discussed herein before, relates to a compact and light weight integral hydraulic power assisted steering gear arrangement having less number of parts with improved output torque to weight ratio and increased fuel efficiency.

Reference is now invited to the accompanying FIG. 1, which illustrates the longitudinal cross section of integral hydraulic power assisted steering gear [1] constructed in accordance with the principle of present invention. The steering gear [1] consists of a housing [2] having an integral cylindrical wall [16] forming a cylinder for reciprocal sliding motion of a piston [4]. The piston [4] partitions the cylinder into a pair of fluid pressure chambers [17] and [18]. The rack piston [3, 4] is supported in the housing [2] directly where it divides the housing into top and bottom pressure chambers. A sealing member [19] is provided on the piston [4] to provide fluid sealing between the pressure chambers [17] and [18].

Also formed in the housing [2] is a fluid inlet port connection [20] and fluid outlet port connection [21] as shown in FIG. 5, which are adapted for connection to suitable hydraulic circuitry including a main fluid pump assembly (not shown in the preferred embodiment). The flow of fluid is directed to and from the pressure chambers [17] and [18] by means of a valve assembly [5] which is housed within a chamber [9] with a reduced diametrical cylinder bore in the housing. The reduced diametrical chamber hereinafter referred to as valve chamber [9]. The axis of the valve chamber [9] and that of the cylinder where the piston [4] slides axially to and from are positioned in such a way that they are not concentric to each other. A manually operated shaft journaled for rotation in the housing [2] and having an outer end [8] thereof splined to connect a steering wheel actuates the valve assembly [5].

Referring to the accompanying FIGS. 1, 2, 4 and 6 one or more covers [35] and [44] are provided on the housing [2] for sealing the hydraulic fluid and also to support the follow up member or worm [11] and the output shaft [25]. The covers [35] and [44] comprises of helical grooves [36] and [40] formed on the outer circumference of the covers [35] and [44] and helical grooves [39] and [42] on inner circumference bores [38] and [41] in the housing [2]. Helical grooves [39] and [42] formed on the bores [38] and [41] and helical grooves [36] and [40] formed on the covers [35] and [44] have one or more helical revolutions. Locker wires [37] and [43] which is flexible in construction fixes the covers [35] and [44] on to the housing [2] in the bore [38] and [41]. The locker wires [37] and [43] positioned between the helical grooves [36, 40] and [39, 42] formed on the housing [2] and the covers [35] and [44] provides a rigid support to the axial force acting on it through hydraulic liquid. The helical grooves [36, 40] and [39, 42] and the locker wires [37] and [43] may be of any shape like spherical, oval, squared, rectangle or side flattened. The series of bolts used in the prior art for fixing means are eliminated by the locker wires [37] and [43].

Referring to the accompanying FIGS. 1 and 3, the follow up member or worm [11] has a helical groove [15] formed thereon to receive a plurality of balls [14] and is disposed in an axial bore [23] formed in the rack [3] which interns comprises of helical grooves [24] shaped complementarily to those of the helical grooves [15] formed on the worm [11]. Unlike those in the prior arts, here the rack [3] containing the helical grooves [24] and the piston [4] sliding axially are the two separate components fixed together by fixing means such as a thread or locker wire to prevent them from separating out axially during sliding motion. Such arrangement allows the rack [3] to rotate independently with respect to the piston [4] to accommodate the tapered tooth sector gear [13] while meshing. The helical grooves [15] and the balls [14] residing therein, cause worm [11] to rotate as the piston [4] shifts axially in a manner understood by those skilled in the art. The rack [3] containing the helical groove [24] has a series of rack gear [12] formed on it which mesh with the sector gear [13] formed or located on output shaft [25], providing a rotational movement to the output shaft [25] which conveniently connects to the pitman arm (not shown in the preferred embodiment) through which the mechanical steering linkage is actuated. Thus as the piston [4] moves back and forth in the cylinder, the sector gear [13] and the output shaft [25] rotates in accordance with it to operate the steering linkages which can be understood by those skilled in the art. The rack [3] containing the helical grooves [24] and a series of rack teeth [12] not directly supported on the housing [2] but through a rack supporter assembly [26] on one end and through the piston on the other end.

Referring to FIG. 1, the rack supporter assembly [26] is fixed on the housing [2] and extending radially inwards which supports the rack [3]. The rack supporter assembly [26] comprises of a rack pad adjuster [27], a rack pad [28], spring [29] and a sealing member [30]. The rack pad adjuster [27] is fixed onto the housing [2] through a fixing means such as thread 270 along with the sealing member to lock the hydraulic fluid inside. The rack pad [28] having a flat surface [31] on one side and a hemispherical surface [32] on the other are positioned in between the rack pad adjuster [27] and the rack [3] for support. The rack [3] has a flat face [33] opposite to the series of rack teeth [12] formed thereon, over which the rack pad flat face [31] rest preventing the radial outward displacement of the rack [3], with regard to the housing thereby providing a support.

The hemispherical surface of the rack pad [32] accommodates itself within the hemispherical bore [34] provided in the rack pad adjuster [27] to adjust itself slightly to accommodate the tilt in rack [3] when meshing with the tapered tooth of the sector gear [13] which can be understood by those skilled in the art. The rack supporter assembly [26] reduces the gap between the rack teeth [12] and the sector gear [13] effectively.

Referring to FIGS. 4 and 6, the locker wires [37] and [43] which is flexible in construction fixes the covers [35] and [44] on to the housing [2] in the bores [38] and [44]. The locker wires [37] and [43] take the position between the helical grooves [36, 40] and [39, 42] formed on the housing [2] and the covers [35] and [44] provides a rigid support to the axial force acting on it through hydraulic liquid. The helical grooves [36, 40] and [39, 42] and the locker wire [37] and [43] may be of any shape like spherical, oval, squared, rectangle or side flattened. The series of bolts used in the prior art for fixing means are eliminated by locker wire [37] and [43].

Referring to FIGS. 1 and 5, the valve assembly [5] interns comprises of a pair of rotary valve members [6] and [7] placed concentrically one within the other and journaled for rotation within the valve chamber [9]. The inner valve member [6] and the outer valve member [7] consists of a series of axially extending slots [22] which connects the inlet port [20] and the outlet port [21] with the pressure chambers [17] and [18], for fluid communication towards and out of it. The rotary valve members [6] and [7] are biased to said neutral position by means of a torsion rod [10] which is pinned with the inner valve member [6] on one end for joint rotation along with the follow up member or the worm [11] on the other end, which is formed either separately or integral with the outer valve member [7].

We claim:

1. An integral hydraulic power assisted steering gear arrangement comprising:
   Housing [2];
   A cylinder [16] in the housing [2] having pressure chambers [17] [18];
   An axially bored [23] rack piston [3, 4] slidably carried in the cylinder [116];
   An output shaft [25] journaled on the housing [2] for rotating about an axis with a sector gear [13];
   A worm [11] extending in axial alignment into the bore [23] of rack piston [3, 4];
   An operating steering shaft journaled for rotation on the housing [2];
   A control valve [5] positioned in valve chamber [9] of the housing [2];

An inlet [20] and outlet port [21] integrated with the housing [2]; and

One or more covers [35] and [44] fixed on to the housing [2] through one or more locker wires [37] and [43] for sealing the hydraulic fluid, supporting worm [11] and output shaft [25],
- wherein the rack piston [3, 4] are two separate components as rack [3] and piston [4], said rack [3] and the piston [4] are relatively rotatable with respect to each other,
- wherein the rack [3] with axially bored helical grooves [24] and a series of rack teeth [12] formed thereon is supported by rack supporter assembly [26] on one end and by the piston [4] on other end,
- wherein axis of the valve chamber [9] and that of the cylinder [16] are positioned eccentrically,
- wherein the control valve [5] is connected to the steering shaft and is movable in response to relative rotation of the steering shaft and the output shaft [25], and
- wherein the covers [35] and [44] and the housing [2] fixed by the locker wires [37] and [43] takes position between the helical grooves [36, 40] and [39, 42], formed on the covers [35] and [44] and housing [2] respectively.

2. The integral hydraulic power assisted steering gear as claimed in claim 1, wherein the rack [3] and piston [4] are connected together eccentrically such that axial displacement of the rack [3] and piston [4] is actuated eccentrically with respect to the pressure chambers [17] [18] through the worm [11].

3. The integral hydraulic power assisted steering gear as claimed in claim 2, wherein the worm [11] is connected to the rack piston [3] and [4] for rotating the worm [11] in response to axial movement of the rack piston [3] and [4].

4. The integral hydraulic power assisted steering gear as claimed in claim 3, wherein the worm [11] is interconnected to the steering shaft for rotating the worm [11] in response to the rotation of the steering shaft.

5. The integral hydraulic power assisted steering gear as claimed in claim 4, wherein the worm [11] comprises of helical grooves [15] formed thereon to receive a plurality of balls [14] and is disposed in the axial bore [23] formed in the rack [3].

6. The integral hydraulic power assisted steering gear as claimed in claim 1, wherein the rack supporter assembly [26] comprises of a rack pad [28], rack pad adjuster [27], with or without spring [29] and a sealing member [30].

7. The integral hydraulic power assisted steering gear as claimed in claim 6, wherein the rack pad [28] comprises a hemispherical surface [32] and the rack pad adjuster [27] comprises a hemispherical bore [34] to accommodate tilt of the rack piston [3, 4] when it meshes with tapered teeth of the sector gear [13].

8. The integral hydraulic power assisted steering gear as claimed in claim 1, wherein the covers [35] and [44] and housing [2] are formed with one or more revolutions of helical grooves [36, 40] and [39, 42].

9. The integral hydraulic power assisted steering gear as claimed in claim 8, wherein the locker wires [37] and [43] used for fixing the covers [35] and [44] and the housing [2] can be of any geometrical shapes that include round, oval, squared, rectangle or side flattened.

* * * * *